United States Patent
Bahout

[11] Patent Number: 5,079,882
[45] Date of Patent: Jan. 14, 1992

[54] GASKET FOR MOUNTING ON THE EDGE OF AN ELEMENT SUCH AS A PANEL

[75] Inventor: Bernard Bahout, L'Orinais, Pont-Rean, France

[73] Assignee: Automobiles Peugeot and Automobiles Citroen, France

[21] Appl. No.: 541,120

[22] Filed: Jun. 20, 1990

[30] Foreign Application Priority Data

Jun. 20, 1989 [FR] France .................. 89 08210

[51] Int. Cl.[5] ............................. E04B 1/62
[52] U.S. Cl. ........................ 52/208; 49/490; 52/403
[58] Field of Search ............ 52/403, 208; 49/490, 49/491

[56] References Cited

U.S. PATENT DOCUMENTS

| | | | |
|---|---|---|---|
| 4,092,813 | 6/1978 | Eggert | 52/403 |
| 4,690,412 | 9/1987 | Tuckley et al. | 49/490 |
| 4,848,035 | 7/1989 | Sakuma et al. | 49/491 |
| 4,949,524 | 8/1990 | Martin et al. | 49/490 |
| 4,959,081 | 9/1990 | Methellier | 49/491 |

FOREIGN PATENT DOCUMENTS 8604761.1 1/1986 Fed. Rep. of Germany .
2370206 6/1978 France .

Primary Examiner—James L. Ridgill, Jr.
Attorney, Agent, or Firm—Wong & Husar

[57] ABSTRACT

A seal adapted to be mounted on an edge of an element such as, for example, a sheet metal panel or non-sliding glass of an automobile, and of the type comprising a sealing portion fixed to a channel or U-portion which can be engaged on the edge of the element, the seal comprising, at least one lip articulated to the channel and projecting into the interior of the channel, the lip having a portion for bearing elastically on a wall of the element, and of a profile in the form of an arc of a logarithmic spiral centered on a point of articulation of the lip on the channel, the sprial having a profile wherein the angle made by a radius vector of the spiral with the normal at the point of contact of the lip on the element is less than the angle of friction between the respective materials of the lip and the element.

15 Claims, 2 Drawing Sheets

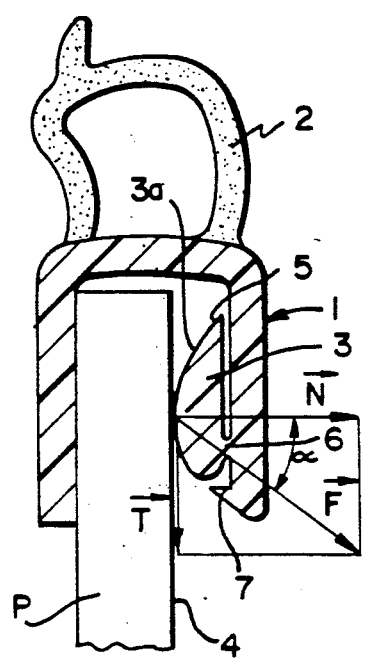
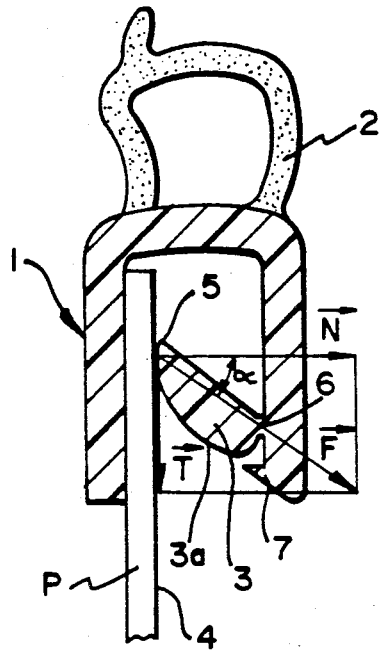
FIG. 2    FIG. 3
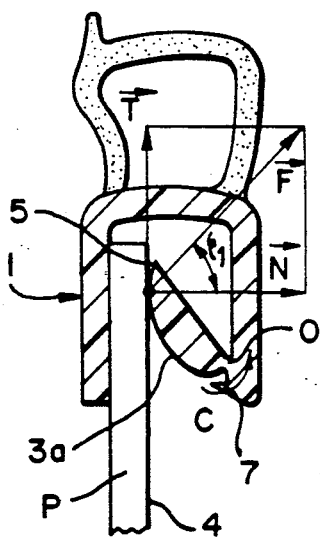
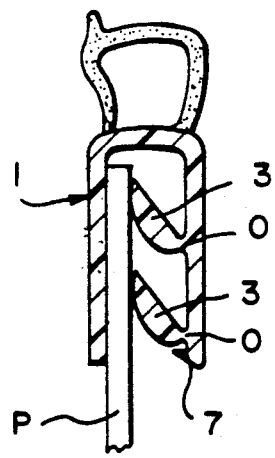
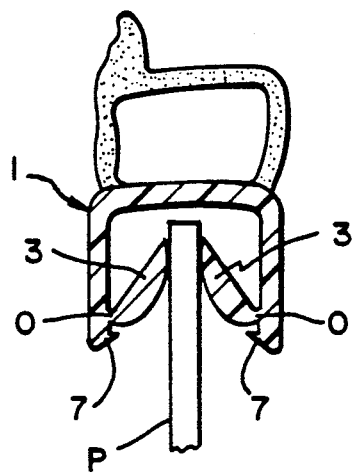
FIG. 4    FIG. 5    FIG. 6

GASKET FOR MOUNTING ON THE EDGE OF AN ELEMENT SUCH AS A PANEL

This invention relates to a gasket or seal strip which can be mounted along the edge of an element such as for example, a panel of sheet metal or non-sliding glass of an automobile.

BACKGROUND OF THE INVENTION

Known gaskets of the above type are comprised essentially of a portion in the form of a clothes-pin shaped channel or U to be engaged by pinching or pressing onto the edge of the panel, and a portion fixed to or integral with the U or channel for performing the seal function.

In this kind of gasket or seal strip, the portion in the form of the channel or U is interiorly provided with one or more lips projecting toward the inside of the U and which elastically bear on a wall of the panel in a manner to exert pressure and obtain the necessary sealing.

To facilitate mounting the seal strip, it is agreed that the channel or U shaped portion should be able to be engaged onto the edge of the panel with minimal effort, and should have great resistance to removal from the panel. However, if the actually known seals have a good resistance to removal, they have unfortunately, a high resistance to engagement on the edge of the panel, which is a disadvantage shown for example by the deterioration of the lips.

In addition, the panel on which the portion of channel or U shape is mounted can have variable thickness. It follows, as a consequence that the same channel should have the same ease of engagement and the same high resistance to removal for panels of different thickness, or for a panel having portions of different thickness, which is not the case with the prior known seal strips or gaskets.

SUMMARY OF THE INVENTION

The purpose of the present invention is to remedy the disadvantages of and reduce the problems mentioned above by providing a seal strip or gasket which has a low resistance to mounting on the edge of a panel and a high resistance to removal, where the resistance to removal is independent of the thickness of the panel.

For this effect, the invention has for an object, a seal strip or gasket which can be mounted on the edge of an element, for example, a panel of metal or non-sliding glass of an automobile, and of the type comprising a portion having a sealing function and fixed to a portion in the form of a channel or U engagable on the edge of the element. The channel or U has at least one interior lip projecting into the interior of the U which is capable of elastically engaging against a wall of the element. The seal strip is characterized in that the internal lip has a profile in the form of an arc of logarithmic spiral which is centered on a point of articulation of the lip on the wall of the channel and which is determined in a manner to obtain a maximum resistance to removal as a function of the nature of the respective materials of the lip and the element.

According to another characteristic of the invention, the logarithmic spiral is such that the angle of the vector ray with the normal at the point of contact of the internal lip with the element is less than the angle of friction of the respective materials of the lip and the element.

The length of the arc of the logarithmic spiral is determined as a function of the respective maximum and minimum possible thicknesses that the element can have.

The seal strip or gasket according to the invention is further characterized in that the aforesaid lip is connected to the internal wall of the channel or U portion by a thin film which is very resistant in tension and compression but very supple in flection.

In accordance with another characteristic of the seal strip, the channel or U portion has on the same internal wall as the lip, a shoulder or flange situated near a free extremity of the channel wall and against which the lip can bear under the effect of forces to remove the element.

The seal strip according to the invention can have one or plural internal lips on one or both internal walls of the channel or U portion.

Additional characteristics and advantages of the invention will become apparent from the detailed description which follows with reference to the accompanying drawings.

BRIEF DESCRIPTION OF THE DRAWINGS

FIG. 2 is a view corresponding to FIG. 1, and shows the seal strip mounted on a relatively thick panel;

FIG. 3 is a view corresponding to FIG. 1, and shows the seal strip mounted on a relatively thin panel;

FIG. 4 is a view corresponding to the previous FIGS. and shows the manner in which the seal strip is mounted on the panel.

FIG. 5 is a view corresponding to FIG. 1, and shows a gasket having two lips on the same wall of the channel; and FIG. 6 is a view corresponding to FIG. 1, and shows a gasket having a first lip on one wall of the channel, and a second lip on another wall of the channel.

DETAILED DESCRIPTION

Figure 1:
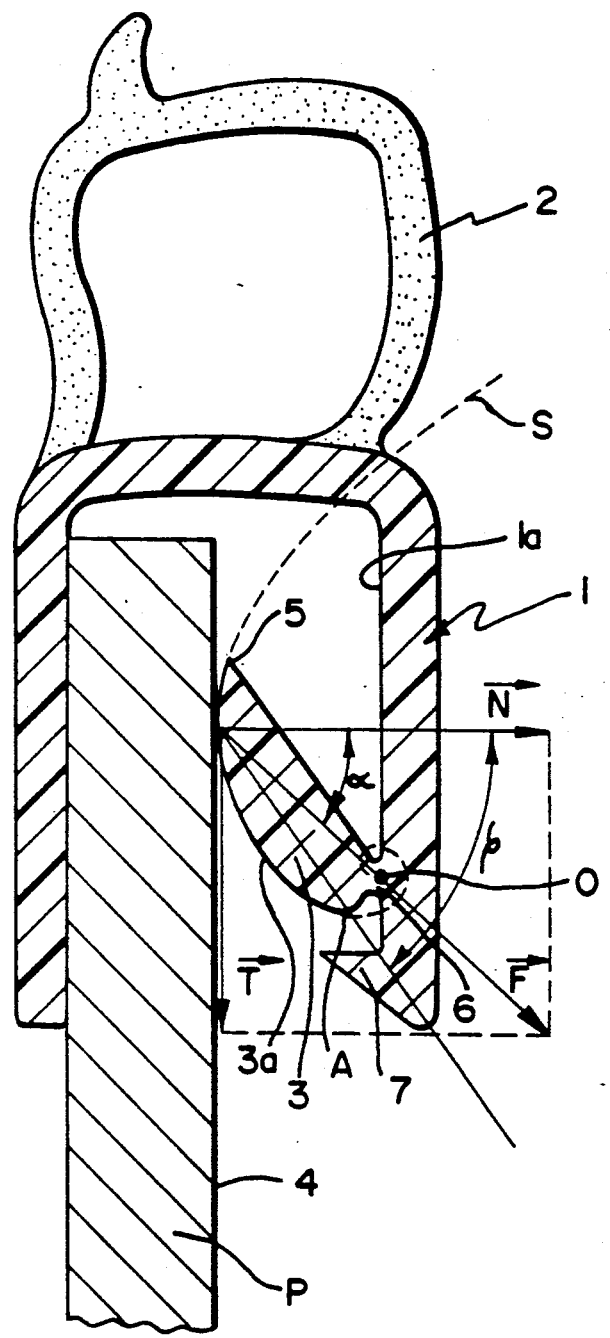
FIG. 1 is view in transverse section of a seal strip or gasket according to the principles of the invention and shows the seal strip mounted on an edge of a panel.

The several Figs. of the drawings show, in transverse section, a seal strip or gasket mounted on a panel P, which can be of a form to cover an opening, or can be a non-sliding window glass of an automobile surrounded by the seal strip.

The seal strip is comprised of a channel or U shaped portion 1 engaged or positioned on the edge of the panel P, and a seal portion 2 for sealing against another element (not shown), such as the frame of an opening, the portion 2 being fixed or integral with the channel portion 1. These portions 1 and 2 are of an appropriate material such as rubber, elastomer, or similar material.

The portion 1 in the form of the channel is provided in its interior with one or several lips such as lip 3 which project toward the interior of the channel and can elastically bear against the wall 4 of panel P to thus perform a clamping and sealing function.

In accordance with the invention and as well shown at FIG. 1, the portion 3a of the lip 3 faces the wall 4 of panel P and has a profile in the form of an arc S of a logarithmic spiral which is centered on the hinge point or point of articulation 0 of the lip 3 on the internal wall of the channel 1.

The logarithmic spiral is determined in a manner to obtain a maximum resistance to removal of the seal strip as a function of the nature of the material of the lip 3 and the panel P respectively, as will soon be explained in greater detail.

It is to be understood that, according to the characteristics of a logarithmic spiral, the angle formed by the line joining any point of the spiral to the center of the spiral and tangent to the curve at that point is constant so that, in the present case, the lip 3 will be able to exert a force opposing the removal of the seal strip whose orientation is independent of the thickness of the panel.

FIG. 1 shows the normal force N at the point of contact of the lip 3 on the wall 4 of panel P, the force of traction T to resist removal of the seal strip, and the resultant F which passes through the center 0 of the logarithmic spiral and which coincides with the radius vector of the spiral.

Thus, as well shown at FIG. 1, the logarithmic spiral S is such that the angle $\alpha$ (alpha) of the radius vector F with the normal N is less than the angle of friction $\phi$ (psi) of the respective materials of the lip and the panel P.

Differently stated, the angle $\alpha$ (alpha) being less than the angle $\phi$ (psi), there is jamming or wedging of the lip 3 which then opposes removal, that is to say which locks the channel portion 1 of the seal strip on the panel P.

The length of the arc of the logarithmic spiral constituting the portion 3a of the lip 3 is determined as a function of the maximum and minimum possible thicknesses which the panel P can present in the channel 1 of the seal strip.

Thus, as shown at FIG. 1, the form of the arc of logarithmic spiral of the portion 3a of the lip 3 will extend from the point A essentially to the free end 5 of the lip 3. Referring to FIGS. 2 and 3, it can be seen that the resultant force F makes the same angle $\alpha$ (alpha) with the normal force N for a thick panel (FIG. 2), or for a thin panel (FIG. 3), and is expressed by the relation $F = T/\sin \alpha$ (alpha) regardless of the thickness of the panel.

Thus, the wedging of the lip 3 will be obtained regardless of the thickness of the panel, this not being the case with the know prior seals. In other words, if the material of the lip 3 and of the panel P are selected in such a manner that the angle $\alpha$ (alpha) is less than or equal to the angle $\phi$ (psi), one will obtain wedging or jamming of the lip for all thicknesses of panels compatible with the seal strip.

The lip 3 is connected to the internal wall of the channel portion 1 by a thin film or thin web 6, as shown at FIG. 1. The thin web acts as a hinge and is very resistant in tension and compression and very supple in flection, in order to allow a low force to mount the seal on the panel P, while maintaining an excellent resistance to removal after mounting, thanks to the wedging of the lip.

In this respect, it can be seen from FIG. 4 that the resistance to mount the joint depends on the opposing torque by the hinge to deflection or pivoting of the lip. This torque C will be very low if the film-hinge is very thin. It is to be understood, however, that the torque exerted by the hinge is sufficient to maintain the lip in engagement with the wall 4 of the panel.

A flange or shoulder 7 is provided at the free end of the channel portion 1, and against which the inner end of the lip 3 can bear under the action of a force exerted to remove the seal. This flange 7 which projects toward the inside of the channel and is on the same side as the lip 3, is not mandatory, but provides the advantage of being able to use a very thin film hinge because, thanks to the flange on which the lip can seat, there is little risk that the film hinge will tear.

FIGS. 1 to 4 show a single lip 3, but the seal strip according to the invention can have plural internal lips on the same wall 1a of the channel as shown at FIG. 5, or on opposed walls of the channel as shown at FIG. 6. It is also to be understood that plural lips, such as shown at FIG. 5 can be provided on both inner side walls of the embodiment of FIG. 6. While FIGS. 5 and 6 show the seal strip or gasket with plural lips mounted on a thin panel, the gasket of these embodiments can also be used on a thick panel, and the lips will then each be in a more upright position in the channel, as shown at FIG. 2 for a channel with a single lip.

There is thus obtained, according to the invention, a seal strip or gasket with a low resistance to mounting on the edge of a panel P and a high resistance to removal which is independent of the thickness of the panel on which it is mounted.

It has been observed, in this respect that the force to mount or seat the seal strip and the force to remove it are in a ratio of about 1 to 10, rather than 1 to 2 or 1 to 3 with the prior known seals having lips.

It is to be understood that the invention is not limited to the embodiment shown and described which is given as a non-limiting example.

Thus, there can be any number of lips, the same with the material or materials of the seal strip.

Similarly, there can be additional lips on the portions of the channel or U shown in the drawings which do not have lips, and their form can be different from the logarithmic spiral, such additional lips assuring generally the sealing function and/or the localization of the pressure on the panel.

The invention comprises all equivalent techniques and means described as well as their combinations if they are within its spirit.

I claim:

1. A seal adapted to be mounted on an edge of an element such as, for example, a sheet metal panel or non-sliding glass of an automobile, and of the type comprising a sealing portion fixed to a channel or U-portion which can be engaged on the edge of the element, said seal comprising, at least one lip articulated to the channel and projecting into the interior of the channel, said lip having a portion for bearing elastically on a wall of the element, and of a profile in the form of an arc of a logarithmic spiral centered on a point of articulation of the lip on the channel, said spiral having a profile wherein the angle made by a radius vector of the spiral with the normal at the point of contact of the lip on the element is less than the angle of friction between the respective materials of the lip and the element.

2. A seal according to claim 1 wherein the channel further comprises, a flange on the same wall of the channel as the lip and near an inner end of the lip.

3. A seal according to claim 1 wherein said seal comprises a plurality of said lips on the same wall of said channel.

4. A seal according to claim 1 wherein said seal comprises a plurality of said lips on opposed walls of said channel.

5. A seal according to claim 1 wherein the length of the arc of logarithmic spiral is a function of the respective maximum and minimum possible thickness of the element.

6. A seal according to claim 1 wherein said lip is connected to an internal wall of the channel by a very flexible thin film hinge having high resistance to traction and compression.

7. A seal according to claim 1 wherein the channel further comprises, a flange on the same wall of the channel as the lip and near an inner end of the lip.

8. A seal according to claim 1 wherein said seal comprises a plurality of said lips.

9. A seal according to claim 1 wherein the length of the arc of logarithmic spiral is a function of the respective maximum and minimum possible thicknesses of the element.

10. A seal according to claim 9 wherein said lip is connected to an internal wall of the channel by a very flexible thin film hinge having high resistance to traction and compression.

11. A seal according to claim 9 wherein the channel further comprises, a flange on the same wall of the channel as the lip and near an inner end of the lip.

12. A seal according to claim 9 wherein said seal comprises a plurality of said lips.

13. A seal according to claim 1 wherein said lip is connected to an internal wall of the channel by a very flexible thin film hinge having high resistance to traction and compression.

14. A seal according to claim 13 wherein the channel further comprises, a flange on the same wall of the channel as the lip and near an inner end of the lip.

15. A seal according to claim 13 wherein said seal comprises a plurality of said lips.

* * * * *